(No Model.)
J. ROBINSON.
GATE.
No. 282,374. Patented July 31, 1883.
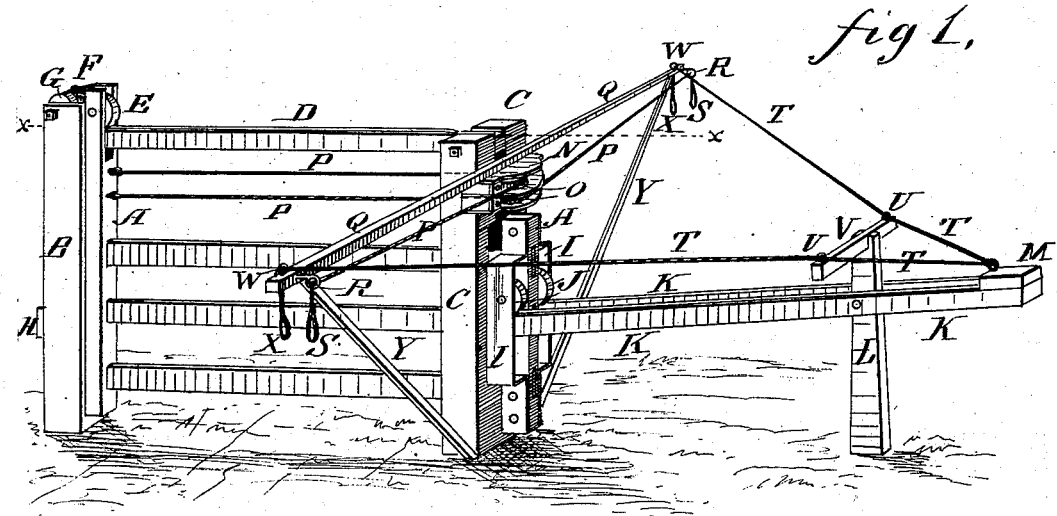
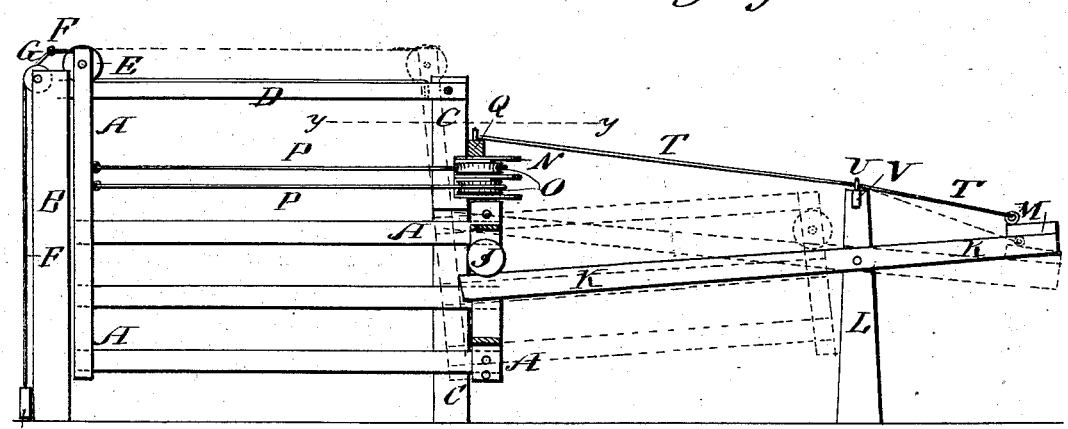
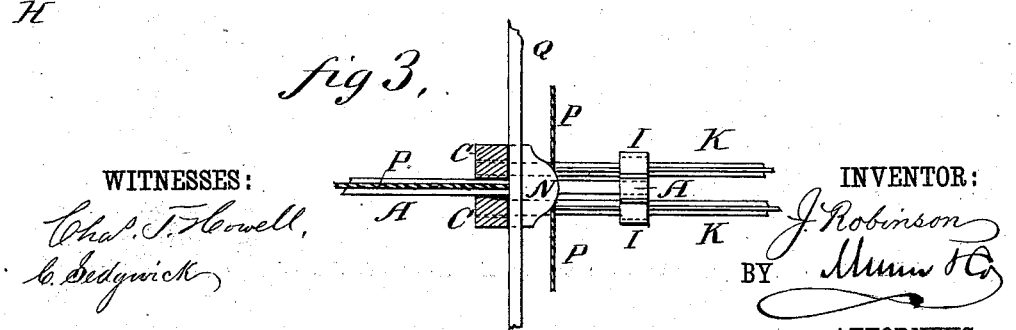
WITNESSES:
Chas. T. Howell
C. Sedgwick
INVENTOR:
J. Robinson
BY
ATTORNEYS.
N. PETERS. Photo-Lithographer, Washington, D.C.

UNITED STATES PATENT OFFICE.

JOB ROBINSON, OF BALDWIN CITY, KANSAS.

GATE.

SPECIFICATION forming part of Letters Patent No. 282,374, dated July 31, 1883.

Application filed March 26, 1883. (No model.)

*To all whom it may concern:*

Be it known that I, JOB ROBINSON, of Baldwin City, in the county of Douglas and State of Kansas, have invented a new and useful Improvement in Gates, of which the following is a full, clear, and exact description.

Reference is to be had to the accompanying drawings, forming a part of this specification, in which similar letters of reference indicate corresponding parts in all the figures.

Figure 1 is a perspective view of my improvement. Fig. 2 is a side elevation of the same, part being broken away. Fig. 3 is a sectional plan view of a part of the same, taken through the line $y\ y$, Fig. 2.

The object of this invention is to promote convenience in opening and closing gates.

A represents a gate, which may be made of any desired size or style. B is the forward post, against which the gate A shuts. The rear end of the gate A is placed between two parallel posts, C, to and between the upper ends of which is secured the rear end of the bar D. The forward end of the bar D is slightly inclined downward, and is secured to the upper end of the forward post, B. The posts B C are designed to be made of such a height that the bar D will be out of the way of those passing through the gateway.

To and between the upper ends of the forward upright bars of the gate A, which pass up at the opposite sides of the bar D, is pivoted a roller or wheel, E, to roll along the upper side of the bar D and support the forward end of the said gate.

To the upper ends of the front upright bars of the gate A is attached the end of a cord, F, which passes over a pulley, G, pivoted in a slot in the upper end of the forward post, B, and has a weight, H, attached to its lower end to close the gate and hold it shut.

To the opposite sides of the rear end of the gate A, and to keepers I, attached to the said sides, are pivoted rollers J, to roll along the upper sides of the inclined parallel bars K, which are placed at such a distance apart as to receive the gate A between them, and which are pivoted at a little distance from their rear ends to the opposite sides of the upper part of the post L. The bars K are made of such a length that the gate A will be fully opened before its rear end comes in contact with the post L. The rear ends of the bars K are connected, and to them is attached a weight, M, of such a gravity as to raise the forward ends of the bars K into an upwardly-inclined position, as shown in dotted lines in Fig. 2, so as to lock the gate open.

To the upper part of the outer sides of the posts C is attached a pulley-block, N, in which are pivoted two pulleys, O, placed one above the other.

P are two cords which pass in opposite directions around the pulleys O, and are attached at their forward ends to the upper parts of the front uprights of the gate A. The rear parts of the cords P extend in opposite directions along the bar Q, pass through guide-eyes R, or around guide-pulleys at the ends of the said bar Q, and have loops or other handles, S, formed upon or attached to their outer ends. The bar Q is attached at its center to the posts C, and is made of such a length that a person riding in a carriage can reach the handles S before the horses come in contact with the gate A. To the weighted rear ends of the bars K are attached the rear ends of two cords, T, which pass through guide-eyes U, or around guide-pulleys attached to the ends of a short bar, V, attached at its center to the upwardly-projecting end of the post L. The cords T pass through guide-eyes W, or around guide-pulleys attached to the ends of the bar Q, and have loops or other handles, X, formed upon or attached to their ends. The end parts of the bar Q are strengthened in position by the braces Y, the upper ends of which are attached to the said end parts of the said bar, and their lower ends are attached to the lower parts of the posts C. With this construction, as the handle S of either of the cords P is pulled upon, the gate A will be drawn back, the wheel E rolling upon the bar D and the wheels J rolling upon the bars K. As the gate A approaches the limit of its rearward movement the point of pressure of the said gate approaches so near to the pivoting-point of the bars K that the weight M will overbalance the gate A and cause the said bars to take an inclined position, with their forward ends raised, as shown in dotted lines in Fig. 2, so as to hold the said gate open. When the operator, whether on foot, on horseback, or in a vehicle, has passed through the gateway, he grasps the handle X and pulls upon the cord T, which raises the rear ends of the bars K and causes the forward ends of the said bars to incline downward, so that the gate will be closed by its own gravity and by the gravity of the weight H.

When the gate is made small—as, for instance, when intended only for the use of pedestrians—the pulleys, cords, and weights can be omitted and the inclined bars K made stationary, in which case the gate will be opened by pushing it back, and will be closed by its own weight.

The upper sides of the bars D K should be faced with metal to prevent wear, and to cause the rollers E J to move upon them more easily.

Having thus fully described my invention, I claim as new and desire to secure by Letters Patent—

1. The combination, with the gate A and posts B C, of the pulleys O O on posts C, the cords P P, passing in opposite directions about said pulleys and attached to the front vertical bar of the gate, the bar Q, attached to the posts C, the bar V, attached to a post, L, the cords T T, having handles X X, the bars K, and the rollers J, as shown and described.

2. The combination, with the gate A, provided with the inclined bar D and the pulleys E J, of the pivoted and weighted inclined bars K, the cords T, and the bar Q, substantially as herein shown and described, whereby the gate will be held open and can be readily closed, as set forth.

JOB ROBINSON.

Witnesses:
G. W. STUART,
WILLIAM DIETZ.